United States Patent
Post et al.

(10) Patent No.: US 10,755,258 B1
(45) Date of Patent: *Aug. 25, 2020

(54) SENSOR-BASED TRANSACTION AUTHORIZATION VIA MOBILE DEVICE

(71) Applicant: Square, Inc., San Francisco, CA (US)

(72) Inventors: Daniel Jeffrey Post, San Mateo, CA (US); Thomas Templeton, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 15/816,174

(22) Filed: Nov. 17, 2017

Related U.S. Application Data

(63) Continuation of application No. 13/961,827, filed on Aug. 7, 2013, now Pat. No. 9,824,348.

(51) Int. Cl.
*G06G 5/00* (2006.01)
*G06Q 20/20* (2012.01)
*G06T 11/20* (2006.01)

(52) U.S. Cl.
CPC ......... *G06Q 20/206* (2013.01); *G06Q 20/204* (2013.01); *G06T 11/203* (2013.01)

(58) Field of Classification Search
CPC ....................................................... G06G 5/00
USPC ....................................................... 345/156
See application file for complete search history.

(56) References Cited

U.S. PATENT DOCUMENTS

| | | |
|---|---|---|
| 6,501,475 B1 | 12/2002 | Cheng |
| 7,280,096 B2 | 10/2007 | Marvit et al. |
| 9,824,348 B1 * | 11/2017 | Post ..................... G06Q 20/206 |
| 2003/0085868 A1 | 5/2003 | Paul et al. |
| 2009/0262069 A1 * | 10/2009 | Huntington ............. G06F 21/34 345/156 |
| 2011/0156867 A1 | 6/2011 | Carrizo et al. |
| 2012/0323597 A1 | 12/2012 | Woolford |
| 2014/0009378 A1 | 1/2014 | Chew |
| 2014/0375573 A1 | 12/2014 | Idzik et al. |

OTHER PUBLICATIONS

Farella, E., et al., "Gesture Signature for Ambient Intelligence Applications: A Feasibility Study," Pervasive Computing, Lecture Notes in Computer Science, vol. 3968, pp. 288-304 (2006).
Non-Final Office Action dated Sep. 17, 2015, for U.S. Appl. No. 13/961,827, of Post, D.J., et al., filed Aug. 7, 2013.
Non-Final Office Action dated Mar. 8, 2016, for U.S. Appl. No. 13/961,827, of Post, D.J., et al., filed Aug. 7, 2013.

(Continued)

*Primary Examiner* — Russell S Glass
(74) *Attorney, Agent, or Firm* — Polsinelli, PC

(57) ABSTRACT

A method that includes receiving, from one or more motion sensors in a device, data describing a signature arc in three-dimensional space, the signature arc having been generated by gesturing using the device; identifying, from the data describing the gestured signature arc, a plurality of points that correspond to the gestured signature arc in three-dimensional space; generating a curve along the identified plurality of points corresponding to the gestured signature arc; generating a two-dimensional representation of the gestured signature arc; and displaying, on a display screen, the generated two-dimensional representation of the gestured signature arc.

19 Claims, 6 Drawing Sheets

(56) References Cited

OTHER PUBLICATIONS

Final Office Action dated Jul. 15, 2016, for U.S. Appl. No. 13/961,827, of Post, D.J., et al., filed Aug. 7, 2013.
Advisory Action dated Nov. 4, 2016, for U.S. Appl. No. 13/961,827, of Post, D.J., et al., filed Aug. 7, 2013.
Notice of Allowance dated Jun. 15, 2017, for U.S. Appl. No. 13/961,827, of Post, D.J., et al., filed Aug. 7, 2013.

* cited by examiner

Series of acceleration values

Translated into points in 3d space

Points after being projected onto a plane

US 10,755,258 B1

SENSOR-BASED TRANSACTION AUTHORIZATION VIA MOBILE DEVICE

CROSS-REFERENCE TO RELATED APPLICATIONS

This application is a continuation of U.S. application Ser. No. 13/961,827, filed Aug. 7, 2013, entitled, "GENERATING A SIGNATURE WITH A MOBILE DEVICE", which is hereby incorporated by reference herein in its entirety.

TECHNICAL FIELD

This disclosure relates to electronic signatures, e.g., for payment transactions.

BACKGROUND

In a conventional point-of-sale electronic credit card transaction, the transaction is authorized and captured. In the authorization stage, a physical credit card with a magnetic stripe is swiped through a merchant's magnetic card reader, e.g., as part of a point-of-sale device. In the capture stage, the approved transaction is again routed from the merchant to the credit card processor, card network and card issuer, and the payment request can include the cardholder's signature (if appropriate). Generally, electronic payment transactions between a user and a merchant are concluded after the user provides a signature by signing (e.g., using a stylus or their finger or some other implement) on a signature screen that is presented on a display of a merchant device. The capture state can trigger the financial transaction between the card issuer and the merchant, and optionally creates a receipt.

SUMMARY

This specification relates to generating electronic signatures, e.g., for authorizing payment transactions. Rather than writing on a touchpad, a user holds a device (e.g., a mobile device or card reader equipped with motion sensors) and gestures in space with the device to generate an electronic signature. The user can generate the electronic signature by using the device to gesture a signature in a three-dimensional (3D) space. For example, the user can move (e.g., wave) the device, in the air, in a pattern that is similar to how the user would typically sign their signature on a two-dimensional (2D) surface (e.g., a piece of paper or a signature screen). The motion sensor in the device tracks and captures the device's motion and orientation in 3D space. The device uses the captured motion and orientation information to generate the user's electronic signature, as described below. The electronic signature is a 2D representation (e.g., an image) of the gestured signature in 3D space.

In one aspect, a system includes a card reader including a read head, a plurality of motion sensors, one or more processors, the card reader configured to encode card information from the read head, modulate the encoded card information into a signal, send the signal to a point of sale system, receive, from one or more motion sensors in the card reader, data describing a signature arc in three-dimensional space, the signature arc having been generated by gesturing using the card reader; and a point of sale system configured to receive a signal describing encoded card information; and receive data describing a two-dimensional representation of a gestured signature arc; wherein at least one of the card reader and the point of sale system is configured to generate a two-dimensional representation of the gestured signature arc from the data describing the gestured signature arc.

Implementations may include one or more of the following features. The point of sale system is further configured to display, on a display screen, the two-dimensional representation of the gestured signature arc. The point of sale system is further configured to store data describing the two-dimensional representation of the gestured signature arc. The card reader is further configured to record the gesturing of the signature in response to a user pressing a button on the card reader. The card reader is further configured to automatically record the gesturing of the signature upon detecting a threshold change a velocity profile of the card reader. The card reader is configured to send the signal to the point of sale system over a wireless connection; and send data describing the two-dimensional representation of the gestured signature arc over the wireless connection.

In one aspect, a method includes receiving, from one or more motion sensors in a device, data describing a signature arc in three-dimensional space, the signature arc having been generated by gesturing using the device; identifying, from the data describing the gestured signature arc, a plurality of points that correspond to the gestured signature arc in three-dimensional space; generating a curve along the identified plurality of points corresponding to the gestured signature arc; generating a two-dimensional representation of the gestured signature arc; and displaying, on a display screen, the generated two-dimensional representation of the gestured signature arc.

Implementations may include one or more of the following features. The device is instructed to record the gesturing of the signature in response to a user pressing a button on the device. The device automatically records the gesturing of the signature upon detecting a threshold change a velocity profile of the device. Identifying, from the data describing the gestured signature arc, a plurality of points that correspond to the gestured signature arc in three-dimensional space further includes filtering the data; rebasing the data to compensate for the user tilting the device in various orientations; and adjusting the data to compensate for drift errors. The data is filtered using a low-pass filter to exclude frequency ranges that exceed a threshold frequency. The data is filtered using a band-pass filter. The data is filtered using a high-pass filter.

Generating a curve along the identified plurality of points corresponding to the gestured signature arc comprises fitting a Bezier curve to the identified plurality of points. Generating a two-dimensional representation of the generated curve comprises positioning a camera viewport to capture a projection of the generated curve. Positioning a camera viewport to capture a projection of the generated curve further includes projecting the generated curve in a direction in which the gestured signature progresses in three-dimensional space; and aligning a plane in a direction along the projected generated curve. Positioning a camera viewport to capture a projection of the generated curve includes determining a mean of the identified plurality of points; and positioning the camera viewport along a vector that is normal to the determined mean of the identified plurality of points.

Respective weights of one or more portions of the two-dimensional representation of the gestured signature arc are functions of respective tilts of the device during the gesturing of the one or more portions of the signature arc. Respective weights of one or more portions of the two-dimensional representation of the gestured signature arc are functions of respective acceleration of the device during the gesturing of the one or more portions of the signature arc. The device comprises a mobile device. The device comprises a card reader.

In one aspect a user device includes a plurality of motion sensors; and a processor configured to receive, from the plurality of motion sensors, data describing a signature arc in three-dimensional space, the signature arc having been generated by gesturing using the device; identify, from the data describing the gestured signature arc, a plurality of points that correspond to the gestured signature arc in three-dimensional space; generate a curve along the identified plurality of points corresponding to the gestured signature arc; generate a two-dimensional representation of the gestured signature arc; and communicate data describing the two-dimensional representation of the gestured signature arc to a point of sale system.

Implementations may include one or more of the following features. The one or more sensors includes one or more accelerometers. The one or more sensors includes one or more gyroscopes. The device is instructed to record the gesturing of the signature in response to a user pressing a button on the device. The device automatically records the gesturing of the signature upon detecting a threshold change a velocity profile of the device.

In one aspect, a method includes receiving, from one or more motion sensors in a device, data describing a signature arc in three-dimensional space, the signature arc having been generated by gesturing with the device; identifying, from the data describing the gestured signature arc, a plurality of points that correspond to the gestured signature arc in three-dimensional space; identifying, from the plurality of points that correspond to the gestured signature arc in three-dimensional space, one or more collections of points that each describe a respective character; determining a respective horizontal offset for each of the one or more identified collections of points; and generating a curve along points in the one or more collections of points that each describe a respective character.

Implementations may include one or more of the following features. The device is instructed to record the gesturing of the signature in response to a user pressing a button on the device. The device automatically records the gesturing of the signature upon detecting a threshold change a velocity profile of the device. The method further includes storing data describing the one or more collections of points.

Advantages may include one or more of the following. Two-dimensional signatures can be generated by gesturing with a device in three-dimensional space. Users can conclude electronic payment transactions by gesturing a signature using a device.

BRIEF DESCRIPTION OF THE DRAWINGS

Like reference numbers and designations in the various drawings indicate like elements.

DETAILED DESCRIPTION

Figure 1:
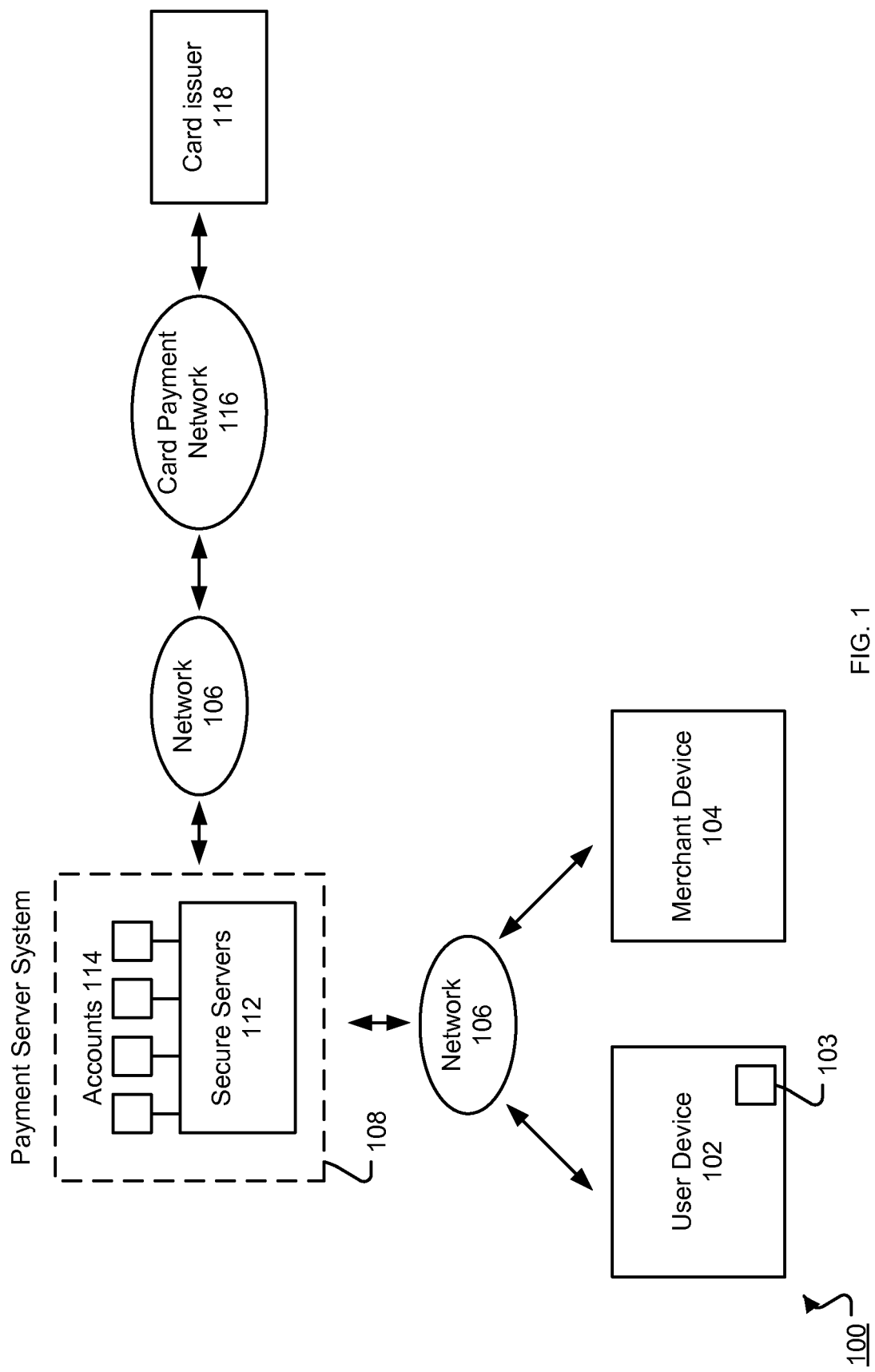
FIG. 1 is a schematic illustration of an example cardless payment system architecture.

FIG. 1 is a schematic illustration of the architecture of an example payment system 100. The overall system 100 includes a user device 102 and merchant device 104 connected to a network 106, e.g., the Internet. The user device 102 is a mobile computing device, e.g., a hand-held computing device, capable of running a user application. For example, the user device 102 can be a mobile device, e.g., a smartphone or tablet computer. The user device 102 can include sensors that can identify the user device's orientation and movement. For example, the user device 102 can include a motion sensor 103 (e.g., one or more accelerometers and one or more gyroscopes) that detects the device's movement and orientation. Depending on the implementation, other types of motion sensors can be used. For example, the user device 102 can include a camera that tracks an infrared (IR) dot, or some other pattern, that is projected from the user device 102. The merchant device 104 is also a computing device capable of running a merchant application. The merchant device 104 can be a mobile device, a desktop computer, a laptop computer, a dedicated point of sale system, or other data processing apparatus.

A payment processor operates a payment service system 108. The user device 102 and the merchant device 104 can communicate with the payment service system 108 through the network 106. The payment service system 108 includes one or more servers 112, at least some of which are configured to service secured transactions (e.g., a secure server), and to process electronic payment transactions between the user device 102 and the merchant device 104. In general, servers 112 can store public merchant information, e.g., the merchant's name, street address, and telephone numbers. The servers 112 can also be configured to transfer and update the user application to the user device 102, and to transfer and update the merchant application to the merchant device 104. The servers 112 can store data describing merchants that have merchant accounts 114 with the payment server system 108. The data describing the merchants can include a merchant name, street address, telephone numbers, and theme, e.g., color motif and logos. The servers 112 can be also be configured to send and receive data describing merchants that have merchant accounts 114 with the payment server system 108 to and from the user device 102 and the merchant device 104. The servers 112 can also be configured to send and receive secure information, e.g., credit card numbers, debit card numbers, bank accounts, user accounts, user identifying information, or other sensitive information to and from the user device 102 and the merchant device 104.

The payment service system 108 can communicate with a computer system 116 of a card payment network, e.g., Visa or MasterCard. The payment service system 108 can communicate with a computer system 116 over the network 106, or over a different network. The computer system 116 of the card payment network can communicate with a computer system 118 of a card issuer, e.g., a bank. There can also be computer systems of other entities, e.g., the card acquirer, between the payment service system 108 and the card issuer.

When the user and the merchant enter into a transaction, the transaction can be processed through the exchange of funds between the user account and the merchant account. To conclude the transaction, a user can gesture a signature using the user device 102 to generate a two-dimensional electronic signature, as described below. The user device 102 can communicate data describing the generated two-dimensional electronic signature to the merchant device 104 over a wireless connection, e.g., using a Bluetooth Low Energy (Bluetooth LE or BLE) chip in the user device 102 that is configured to communicate wirelessly using the BLE wireless protocol. In some implementations, the user device 102 is a card reader that includes one or more sensors that are used to generate the two-dimensional electronic signature, as described below in reference to FIGS. 4A and 4B. In such implementations, the card reader can communicate data describing the generated two-dimensional electronic signature to the merchant device 104 over a wireless connection using, e.g., BLE.

Figure 2:
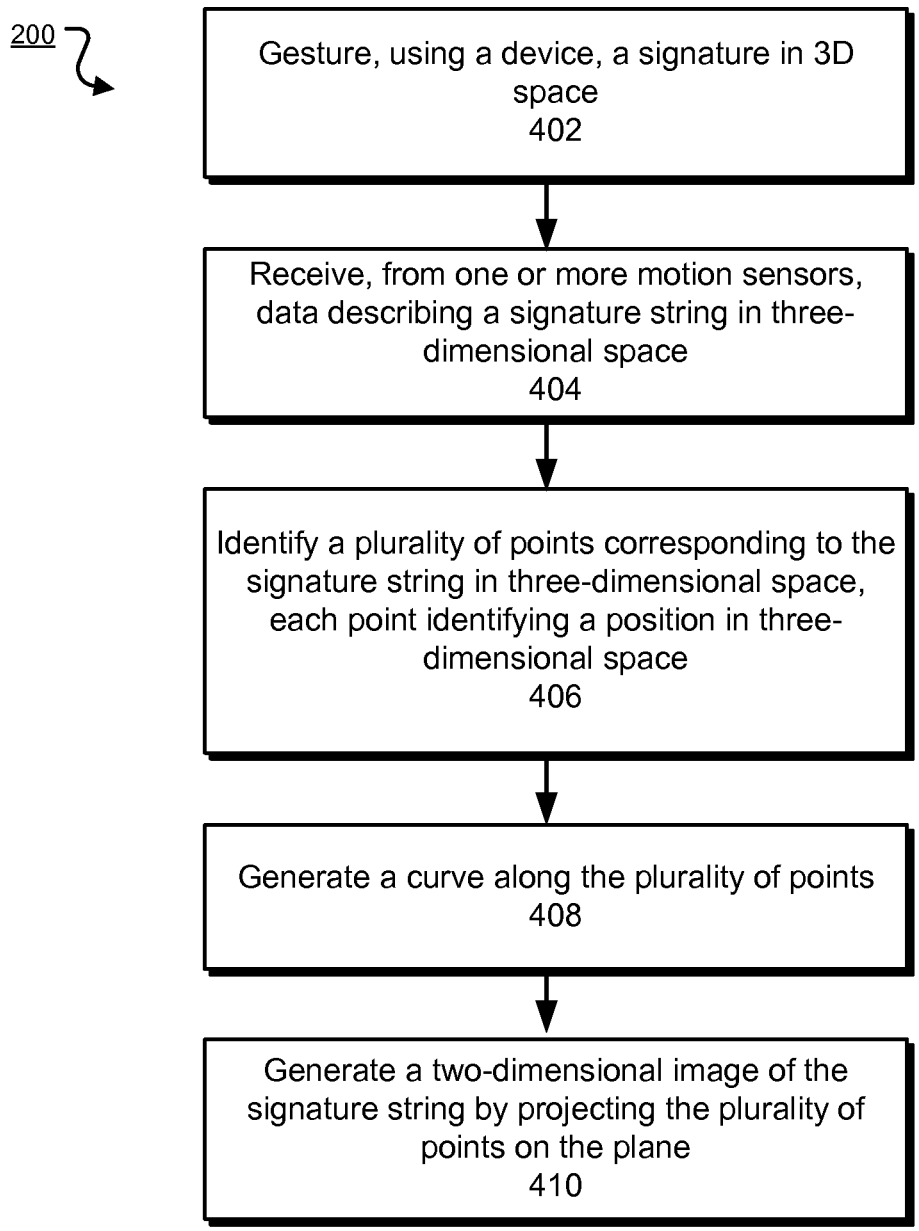
FIG. 2 is a diagram of an example flow chart for generating an electronic signature.

FIG. 2 is a diagram of an example flow chart of a process 200 for generating an electronic signature. For convenience, the process 200 will be described as performed by a device, e.g., the merchant device 104, as described in reference to FIG. 1. In some implementations, this process is implemented through the applications installed on the merchant device 104.

Although the process 200 is described as being performed by the merchant device 104, other implementations are possible. For example, the process 200 can be performed using the user device 102 or a card reader that includes one or more motion sensors (e.g., accelerometers and gyroscopes).

The user gestures a signature using the device (step 402). For example, to conclude the transaction, the user can use the device to generate an electronic signature. The user can generate the electronic signature by gesturing a signature with the device in 3D space. For example, the user can move (e.g., wave) the device, in the air, in a pattern that is similar to how the user would typically sign on a 2D surface (e.g., a piece of paper or a signature screen).

Figure 3A:
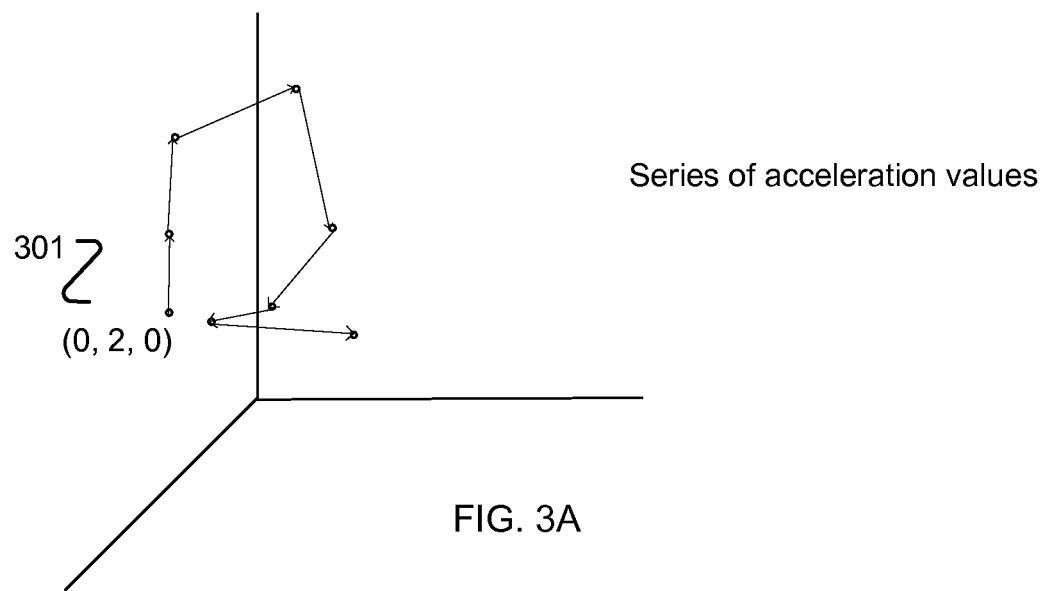
FIGS. 3A-E illustrate an example of generating an electronic signature.

The device receives, from one or more motion sensors in the device, data describing a signature arc in three-dimensional space (step 404). The motion sensor in the device tracks and captures data describing the device's motion and orientation in 3D space. For example, the captured data can include a sequence of acceleration values, e.g., acceleration value 301 (and optionally orientation values), each acceleration value having a timestamp, as illustrated in FIG. 3A. The acceleration values can be captured using one or more accelerometers, and the orientation data can be captured using one or more gyroscopes. Alternatively, the captured data could be velocity values or position values.

In some implementations, the device is instructed to begin recording the user's gestured signature in response to the user pressing a button on the device. In some implementations, the device automatically begins recording the user's gestured signature upon detecting a threshold change (e.g., a sudden jerk) in the movement of the device. For example, the device can identify a sudden change in velocity of the device, e.g., when the user picks up the device off of a counter, and in response, begin recording the user's gestures signature. The device can end recording in response to the user pressing the button, or after a preset total recording time, or after detecting that the device has been stationary for a preset time.

Figure 3B:
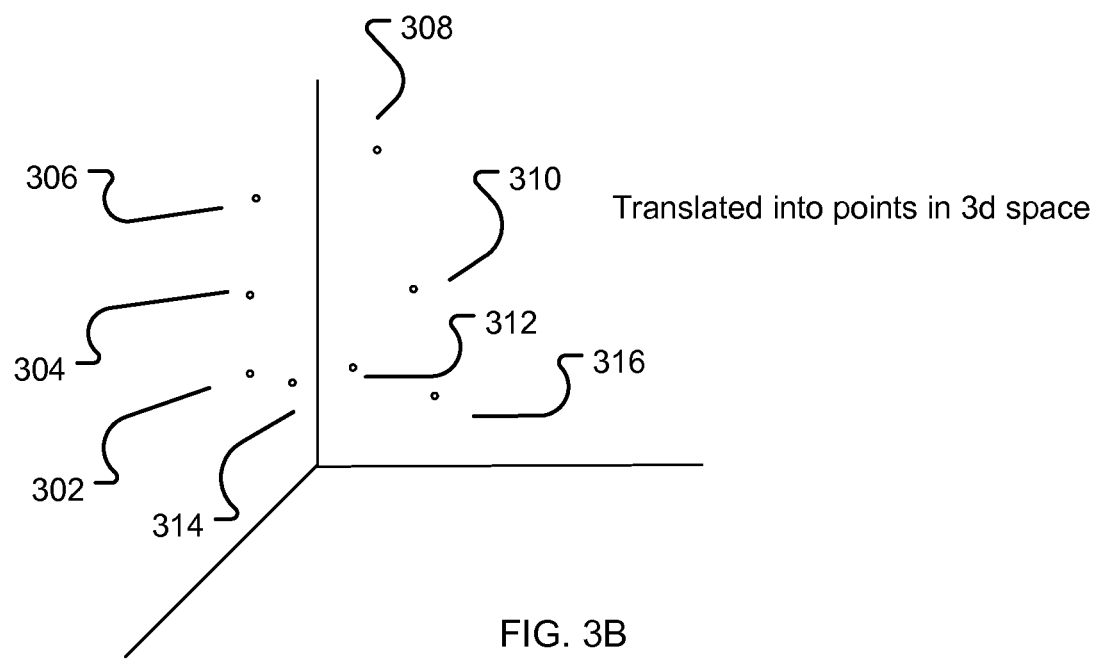

The device determines a sequence of points in 3D space from the data describing the signature arc in 3D space, e.g., as shown in FIG. 3B using points 302, 304, 306, 308, 310, 312, 314, and 316 (step 406).

Each point can be identified by a tuple of position values (one position value for each axis in 3D space). Each point can have a respective timestamp in order to set the order of the points in the sequence. If the data describing the signature arc includes acceleration values for the motion of the device, then device can calculate the position values for the points by double integrating the device's acceleration values over time. Alternatively, if the data describing the signature arc includes velocity values for the motion of the device, then device can calculate the position values for the points by single integrating the device's velocity values over time.

Before or as part of the process of determining the sequence of points in 3D space, the device can filter the captured data to exclude noise (e.g., frequency ranges that exceed a threshold frequency range). The filtering process can be performed using well-known filtering techniques including, for example, a low-pass filter that passes low-frequency signals and attenuates signals with frequencies higher than a threshold frequency. The filtered data represents a sequence of points in 3D space (e.g., x, y, z points in a 3D Cartesian coordinate system). The sequence of points represents the motion of the device through 3D space.

The sequence of points can be rebased (e.g., using data captured from one or more gyroscopes in the device) to compensate for the user tilting the device in various orientations. The device can also compensate for drift errors in situations where the gestured signature drifts up or down by applying a correction using well-known drift correction techniques.

The device also determines the orientation of gravity along the signature arc. The orientation of gravity along the signature arc is used to translate the data into points that correspond to the signature arc in 3D space (e.g., position values of the device in 3D space). The device compensates for gravity in the acceleration number space prior to integrating the device's acceleration values to obtain the velocity, or position. The compensation for gravity can be done using a low-pass filter, for example.

Figure 3C:
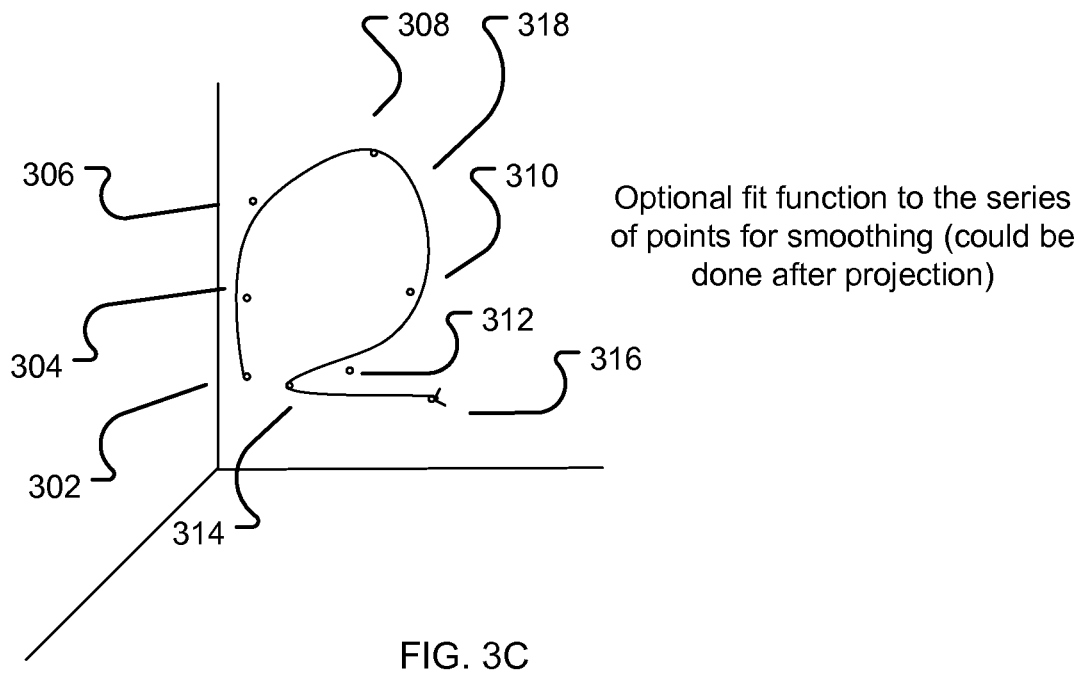

Optionally, the device generates a curve along the identified points corresponding to the signature arc, e.g., as illustrated in FIG. 3C using curve 318 that is generated along the sequence of points 302, 304, 306, 308, 310, 312, 314, and 316 (step 408). In some implementations, the device generates the curve after determining a plane onto which the curve will be projected, as described below. The device can generate the curve using well-known techniques. For example, the device can generate the curve by fitting a Bezier curve to the identified points.

Figure 3D:
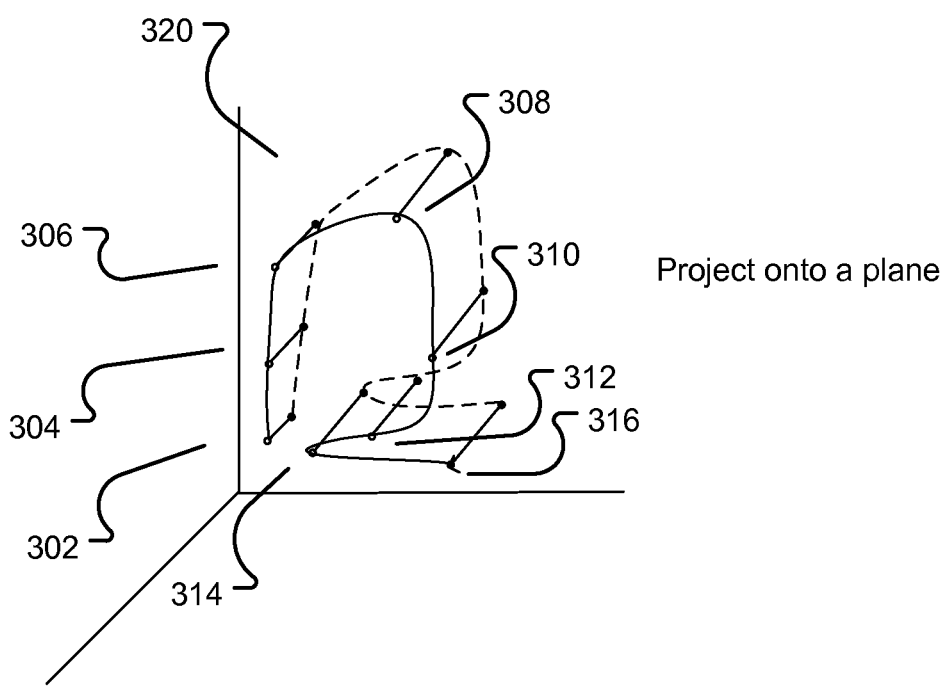
Figure 3E:
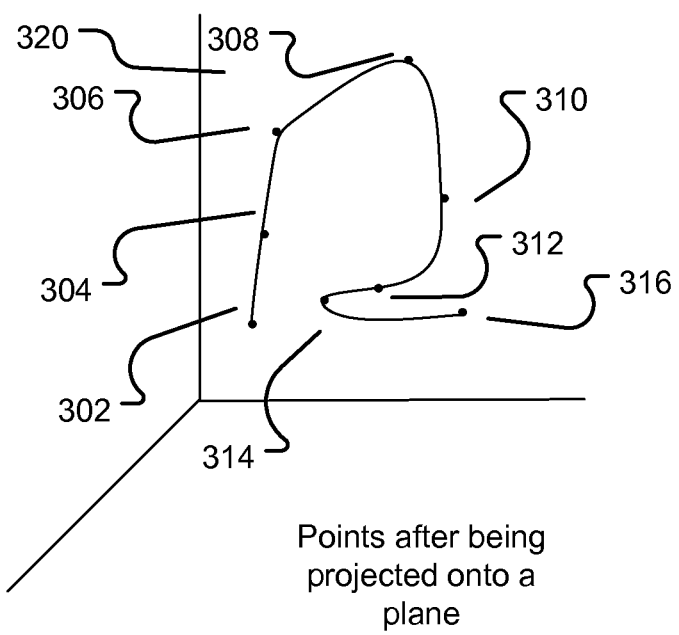

The device generates a 2D image of the 3D signature arc (step 410). The device can generate the 2D image by projecting the generated curve onto a plane, e.g., as illustrated in FIGS. 3D and 3E on plane 320. By projecting the generated curve onto a plane, the device can generate a 2D representation (e.g., an image) of the user's signature that was gestured in 3D space. The device can identify a plane for projecting the generated curve by finding a plane that provides the best fit to the points corresponding to the signature arc. Alternatively, the device can identify a plane by assuming that the signature arc is generally in a vertical plane. Since gravity is a known constant, the device can identify the vertical plane that provides the best fit to the points corresponding to the signature arc. The projection can be performed using well-known rendering techniques. For example, the device can generate the 2D image of the signature arc by positioning a camera viewpoint to capture the projected curve. In some implementations, when positioning the camera viewpoint, the device determines a mean position of the identified points in 3D space. The mean position of the identified points represents a center of mass of the gestured signature. The device then positions the camera viewpoint at a vector that is normal to the plane and passes through the center of mass of the gestured signature (e.g., at a 90 degree angle from the trend line of the gestured signature).

Further, the device positions the camera viewpoint at a suitable distance from the generated curve, so that the viewport of the camera is located at a position that includes both the starting point of the generated curve and the ending point of the generated curve. The position of the camera viewpoint can be optimized so that the generated curve is scaled to a normalized image size. That is, the position of the camera viewpoint can be adjusted so that the camera viewpoint is not too far from the plane, which can result in the electronic signature appearing too small. The device then renders the generated curve from the camera viewpoint to generate a 2D image.

The device can also perform various operations to address the horizontal offset of the signature over time. For example, if the device is moved along the progression of a signature, then the device can apply point interpolation techniques to address the horizontal offset of the signature over time. However, if the device is backtracked (e.g., the user gestures with the device without horizontally moving the device in 3D space or gestures over existing characters), then the device can identify and elide the backtracked motions. The device can identify a backtracking motion by identifying a high and negative horizontal velocity with respect to the average horizontal velocity of the gestured signature.

In some implementations, the weight of one or more portions of the signature in the 2D image is a function of respective tilts of the device during the gesturing of the one or more portions of the signature. For example, the device can use captured data that describes tilts of the device in various orientations to emphasize or deemphasize the weight of one or more portions the generated curve in the 2D image. For example, a positive tilting of the device in one portion of the gestured signature can be used to generate a bolder line for that portion of the signature in the 2D image. Similarly, a negative tilting of the device in another portion of the gestured signature can be used to generate a thinner line for that portion of the signature in the 2D image. In some implementations, the user is given the option to select a pen type (e.g., a bold pen or a calligraphy pen) that is then used to determine the amount of weight that is applied to portions of the signature in the 2D image as a result of tilting the device. In some implementations, the weight of one or more portions of the signature in the 2D image is a function of respective acceleration of the device during the gesturing of the one or more portions of the signature.

Figure 4A:
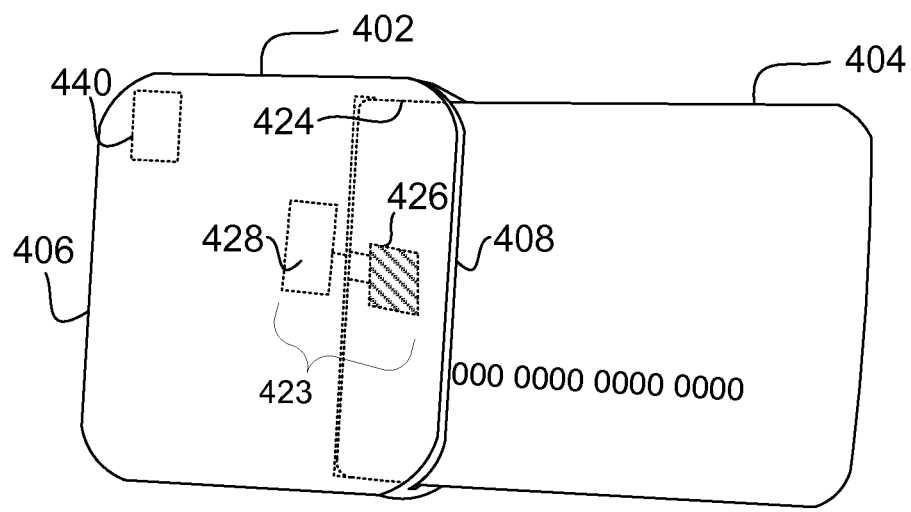
FIG. 4A is an example perspective view of a wireless card reader with a smart chip card being inserted.
Figure 4B:
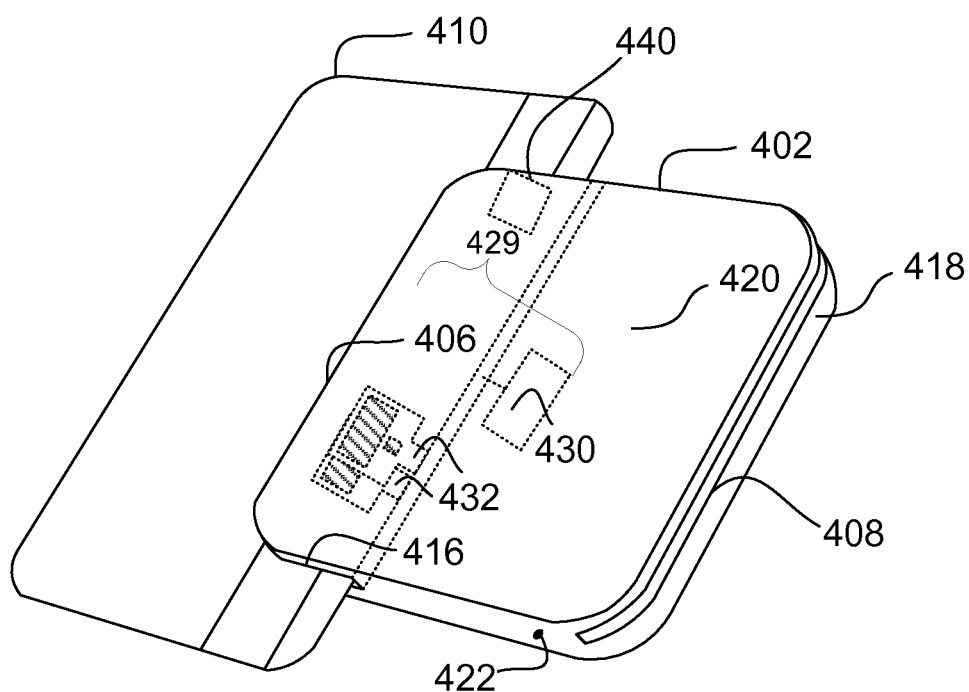
FIG. 4B is an example perspective view of a wireless card reader with a magnetic stripe card being swiped.

FIG. 4A is an example perspective view 400 of a wireless card reader 402 with a smart chip card 404 being inserted at a slot 408 of a chip card reader interface 423. FIG. 4B is an example perspective view 412 of a wireless card reader 400 with a magnetic stripe card 410 being swiped at a groove 406 of a magnetic stripe reader interface 429 that is opposite to the chip card reader interface 423.

The wireless card reader 402 can have a frame that is configured to receive card insertions or card swipes. The frame can include a top surface 420, side surfaces 418, and a bottom surface 422. In the implementations shown in FIGS. 4A and 4B, the wireless card reader 402 has a frame that is shaped as a thin parallelepiped, e.g., the width of the frame (along the top surface 410) is at least five or ten times the height (along the side surfaces 418). The top surface and bottom surface can be generally shaped as a square or rectangle, e.g., a square or rectangle with rounded edges.

The side surfaces 418 can include one or more openings that receive cards through, respectively, one or more card interfaces. The one or more card interfaces include circuitry, e.g., chip card reader circuitry 428 or magnetic stripe reader circuitry 430, configured to read data stored on the card. In some implementations, the wireless card reader has two openings on opposite sides of the frame, and a card interface within each opening.

The wireless card reader 402 can include circuitry configured to direct signals from the one or more card interfaces, to communicate wirelessly with a computing device. The one or more card interfaces of the wireless card reader 402 can include both a chip card reader interface 423 and a magnetic stripe reader interface 429. In some implementations, the interfaces are on opposite sides of the wireless card reader 402 as shown in FIGS. 4A-B. In particular, the card reader 402 can include both a groove 406 on one side surface of the frame and a slot 408 on an opposite side surface of the frame. The groove 406 can extend across the entire width of the frame, and can be configured to receive a swipe of a magnetic stripe card. The magnetic stripe reader interface 429, including magnetic read heads 432 positioned to read the magnetic information on the stripe of the card as it is being swiped, are positioned in the groove 406. The slot 408 can extend across part, but not all of the width of the frame, leaving one or more thin side walls 424 to constrain the lateral position of a chip card as it is inserted into the slot 408. The chip card reader interface 423, including electrical contacts 426 positioned to electrically engage the contacts on the chip card when it is inserted, are positioned in the slot 408. The wireless card reader 402 can also include a motion sensor 440 (e.g., one or more accelerometers and one or more gyroscopes) that detects the card reader's movement and orientation.

In one example scenario, a customer walks into a store and collects items for purchase. When the customer is ready to purchase the items, a merchant interacts with a merchant application running on a device to identify the items for purchase. The merchant application determines the respective costs of each of the items and calculates a total amount owed by the customer. To pay the total amount owed, the merchant can provide the customer with the wireless card reader 402. A display screen of a merchant device can present the customer with details of the transaction, e.g., the items to be purchased and a total amount owed. The display can also instruct the customer to swipe a financial card, e.g., a credit card, through the wireless card reader 402 to complete the transaction. Once the customer swipes a financial card, the display screen of the merchant device instructs the customer to provide the customer's signature. In response, the customer gestures a signature using the wireless card reader 402 to generate a two-dimensional electronic signature. The wireless card reader 402 can capture and store data describing the card reader's movement, and use that data to generate the two-dimensional electronic signature. In some implementations, the wireless card reader 402 communicates the captured data describing the card reader's movement to a merchant device, e.g., the merchant device 104. In such implementations, the merchant device 104 uses the data to generate the two-dimensional electronic signature. The wireless card reader 402 can also wirelessly communicate card data of the swiped financial card, together with data describing the generated two-dimensional electronic signature to the computing device. Once signing is complete, the customer hands the wireless card reader 402 back to the merchant. The merchant can then interact with the merchant device to submit the transaction to a payment system (e.g., payment system 100). The payment system can send a message back to the merchant device indicating that the transaction was successful and the transaction is then complete.

In another example scenario, a customer can pay for a transaction without having to interact with the wireless card reader 402. For example, the customer can have a user account with a payment system (e.g., payment system 100) that stores data describing the customer (e.g., name and a photograph of the customer), together with the customer's financial data (e.g., credit card numbers). When entering a store, the customer can interact with the customer's mobile device to check-in at the store. Alternatively, the customer can have an automatic check-in feature enabled on the mobile device that automatically checks in the customer at the store when the mobile device is within a threshold distance of the store. Once checked in at the store, a merchant application running on a merchant device is notified that the customer is present at the store. The customer can then collect items for purchase. When the customer is ready to purchase the items, the customer identifies him or herself to the merchant (e.g., by providing the merchant with a name). The merchant can interact with the merchant application to verify the customer's identity (e.g., by confirming the name and verifying that the customer's physical description matches the photograph displayed on a display screen of the merchant device). The merchant application determines the respective costs of each of the items and calculates a total amount owed by the customer. A display screen of a merchant device can present the customer with details of the transaction, e.g., the items to be purchased and a total amount owed. The customer can verbally authorize the transaction. Once the transaction has been authorized, the display screen of the merchant device instructs the customer to provide the customer's signature. The customer can then use the customer's mobile device to gesture a signature to generate a two-dimensional electronic signature. Alternatively, the merchant can provide the customer with the merchant device for use in gesturing the customer's signature. Once signing is complete, the merchant can then interact with the merchant device to submit the transaction to a payment system (e.g., payment system 100). The payment system can send a message back to the merchant device indicating that the transaction was successful and the transaction is then complete.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A point of sale (POS) device, the POS device comprising:
   a user interface that receives transaction information identifying a transaction between a buyer and a merchant;
   a payment object reader interface that reads payment object data from a payment object associated with the buyer;
   a projector that projects an infrared dot pattern;
   a camera;
   memory storing instructions; and
   one or more processors, wherein execution of the instructions by the one or more processors causes the POS device to:
      track the infrared dot pattern via the camera to identify a plurality of points in a three-dimensional space, and
      authorize completion of the transaction between the buyer and the merchant using the payment object data in response to identifying the plurality of points in the three-dimensional space.

2. The POS device of claim 1, wherein identifying the plurality of points in the three-dimensional space includes recognizing a gesture of the buyer.

3. The POS device of claim 1, wherein authorizing completion of the transaction between the buyer and the merchant using the payment object data includes sending at least the transaction information and the payment object data to a payment server, wherein the payment server initiates transfer of a transaction amount identified in the transaction information from a payment account associated with the payment object data to a payment account associated with the merchant.

4. The POS device of claim 1, wherein the payment object is a magnetic stripe of a payment card, and wherein the payment object reader interface includes a magnetic read head that reads the magnetic stripe of the payment card.

5. The POS device of claim 1, wherein the payment object is a chip of a payment card, and wherein the payment object reader interface includes a chip card reader that reads the chip of the payment card.

6. The POS device of claim 1, wherein execution of the instructions by the one or more processors causes the POS device to:
initiate transfer of a transaction amount identified in the transaction information from a payment account associated with the payment object data to a payment account associated with the merchant.

7. A method of sensor-based transaction authorization, the method comprising:
retrieving transaction information identifying a transaction between a buyer and a merchant;
retrieving buyer payment information associated with the buyer;
projecting an infrared dot pattern from a projector;
tracking the infrared dot pattern via a camera to identify a plurality of points in a three-dimensional space; and
authorizing completion of the transaction between the buyer and the merchant in response to identifying the plurality of points in the three-dimensional space.

8. The method of claim 7, further comprising:
sending at least the transaction information and the buyer payment information to a payment server, wherein the payment server initiates transfer of a transaction amount identified in the transaction information from a payment account associated with the buyer payment information to a payment account associated with the merchant.

9. The method of claim 7, further comprising:
initiating transfer of a transaction amount identified in the transaction information from a payment account associated with the buyer payment information to a payment account associated with the merchant.

10. The method of claim 7, wherein identifying the plurality of points in the three-dimensional space includes recognizing a gesture of the buyer.

11. The method of claim 7, further comprising generating a curve along the plurality of points in the three-dimensional space.

12. The method of claim 11, wherein generating the curve along the plurality of points includes fitting a Bezier curve to the plurality of points.

13. The method of claim 11, further comprising rendering the curve.

14. The method of claim 11, further comprising:
identifying a plane that provides a best fit to the plurality of points corresponding to the curve; and
generating a two-dimensional representation of the curve by projecting the curve onto the plane.

15. The method of claim 11, wherein the curve corresponds to a signature arc associated with the buyer.

16. A system for sensor-based transaction authorization, the system comprising:
a user interface that receives transaction information identifying a transaction between a buyer and a merchant;
a projector that projects an infrared dot pattern;
a camera;
memory storing instructions; and
one or more processors, wherein execution of the instructions by the one or more processors causes the one or more processors to:
receive buyer payment information associated with the buyer,
track the infrared dot pattern via the camera to identify a plurality of points in a three-dimensional space, and
authorize completion of the transaction between the buyer and the merchant using the buyer payment information in response to identifying the plurality of points in the three-dimensional space.

17. The system of claim 16, wherein receiving the buyer payment information associated with the buyer includes receiving a signal conveying the buyer payment information from a payment object reader interface, wherein the payment object reader interface reads the buyer payment information from a payment object associated with the buyer.

18. The system of claim 16, wherein receiving the buyer payment information associated with the buyer includes receiving the buyer payment information via the user interface.

19. The system of claim 16, wherein execution of the instructions by the one or more processors causes the one or more processors to generate a curve along the identified points in the three-dimensional space.

* * * * *